(12) United States Patent
Gupta et al.

(10) Patent No.: US 12,705,436 B2
(45) Date of Patent: Aug. 11, 2026

(54) GENERATING DIGITAL CONTENT

(71) Applicant: Adobe Inc., San Jose, CA (US)

(72) Inventors: Mukul Gupta, New Delhi (IN); Yaman Kumar, New Delh (IN); Rahul Gupta, Noida (IN); Prerna Bothra, Bikaner (IN); Mayur Hemani, Noida (IN); Mayank Gupta, Noida (IN); Gaurav Makkar, Hansi (IN)

(73) Assignee: Adobe Inc., San Jose, CA (US)

( * ) Notice: Subject to any disclaimer, the term of this patent is extended or adjusted under 35 U.S.C. 154(b) by 514 days.

(21) Appl. No.: 18/308,907

(22) Filed: Apr. 28, 2023

(65) Prior Publication Data

US 2024/0362427 A1 Oct. 31, 2024

(51) Int. Cl.
*G06F 40/56* (2020.01)
*G06F 40/106* (2020.01)
*G06F 40/169* (2020.01)

(52) U.S. Cl.
CPC ............ *G06F 40/56* (2020.01); *G06F 40/106* (2020.01); *G06F 40/169* (2020.01)

(58) Field of Classification Search
CPC ...... G06F 40/56; G06F 40/106; G06F 40/169; G06F 40/103; G06F 40/30
See application file for complete search history.

(56) References Cited

U.S. PATENT DOCUMENTS 8,977,956 B2 * 3/2015 Ahmadullin .......... G06F 40/186
715/243
10,776,686 B1 * 9/2020 Jacob ........................ G06F 8/33
11,574,020 B1 * 2/2023 Zhai .................... G06F 16/3347
11,755,690 B1 * 9/2023 Margolin ................ G06F 18/24
707/723
11,922,550 B1 * 3/2024 Ramesh .................. G06T 11/60
12,148,119 B2 * 11/2024 Zhang ...................... G06N 3/04
12,217,029 B1 * 2/2025 Andre ....................... G06F 8/35
2008/0162474 A1 * 7/2008 Thong ..................... G06F 16/93
2011/0129159 A1 * 6/2011 Cifarelli ................. G06F 16/51
382/284
2013/0279806 A1 * 10/2013 Tonisson ................ G06F 16/56
382/173

(Continued)

OTHER PUBLICATIONS

"Introducing ChatGPT", OpenAI [retrieved May 4, 2023]. Retrieved from the Internet <https://openai.com/blog/chatgpt>., Nov. 30, 2022, 10 Pages.

(Continued)

*Primary Examiner* — Athar N Pasha
(74) *Attorney, Agent, or Firm* — FIG. 1 Patents

(57) ABSTRACT

In implementations of systems for generating digital content, a computing device implements a generation system to receive a user input specifying a characteristic for digital content. The generation system generates input text based on the characteristic for processing by a first machine learning model. Output text generated by the first machine learning model based on processing the input text is received. The output text describes a digital content component. The generation system generates the digital content component by processing the output text using a second machine learning model. The generation system generates the digital content including the digital content component for display in a user interface based on the characteristic.

20 Claims, 12 Drawing Sheets

(56) References Cited

U.S. PATENT DOCUMENTS

2014/0114941 A1* 4/2014 Ahlberg ................ G06F 16/953 707/706
2014/0330851 A1* 11/2014 Sarkar ..................... G06F 9/445 707/756
2015/0026189 A1* 1/2015 Li ......................... G06F 16/245 707/769
2016/0098405 A1* 4/2016 Gorbansky ............. G06F 16/93 707/749
2017/0322930 A1* 11/2017 Drew .................... G06F 16/338
2017/0337079 A1* 11/2017 Portnoy .................... G06F 9/50
2018/0060302 A1* 3/2018 Liang ...................... G06F 16/35
2020/0105366 A1* 4/2020 Trunck ................... G16B 45/00
2020/0214679 A1* 7/2020 Silberman .............. A61B 8/465
2021/0042314 A1* 2/2021 Batlle ..................... G06F 16/22
2021/0133498 A1* 5/2021 Zhang ..................... G06F 18/28
2022/0108417 A1* 4/2022 Liu ....................... G06T 1/0007
2022/0138483 A1* 5/2022 Zhang ...................... G06N 3/09 382/176
2022/0156992 A1* 5/2022 Harikumar ................ G06T 7/11
2022/0391181 A1* 12/2022 Bansal .................... G06F 40/20
2023/0073843 A1* 3/2023 Sampaio De Rezende ................. G06F 16/56
2023/0153606 A1* 5/2023 Min ......................... G06N 3/08 706/25
2023/0316475 A1* 10/2023 Smith ..................... G06T 11/60
2023/0325495 A1* 10/2023 Anderson .............. G06N 20/00 726/23
2023/0377226 A1* 11/2023 Saharia ................... G06T 11/60
2023/0418882 A1* 12/2023 Parish ................. G06F 16/3347
2024/0104789 A1* 3/2024 Ghosh ..................... G06T 11/00
2024/0112394 A1* 4/2024 Neal ....................... G06T 15/10
2024/0119077 A1* 4/2024 Gao ..................... G06N 3/0985
2024/0203003 A1* 6/2024 Bera ....................... G06T 11/60
2024/0249446 A1* 7/2024 Atzmon .................. G06T 11/00
2024/0295953 A1* 9/2024 Zakharov ............ G06F 3/04845
2024/0296596 A1* 9/2024 Aberman ................ G06T 11/00
2025/0078200 A1* 3/2025 Zhang ....................... G06T 3/10

OTHER PUBLICATIONS

"Jasper", Jasper AI, Inc. [retrieved May 4, 2023]. Retrieved from the Internet <https://www.jasper.ai/>., Feb. 2021, 11 Pages.
"Large language model", Wikipedia, the free encyclopedia [retrieved May 4, 2023]. Retrieved from the Internet <https://en.wikipedia.org/wiki/Large_language_model>., 16 Pages.
"Letterbot AI", Letterbot AI. [retrieved May 4, 2023]. Retrieved from the Internet <https://letterbot.ai/>., 2018, 11 Pages.
"Locality-sensitive hashing", Wikipedia, the free encyclopedia [retrieved May 4, 2023]. Retrieved from the Internet <https://en.wikipedia.org/wiki/Locality-sensitive_hashing>., 10 Pages.
"Tf-idf", Wikipedia, the free encyclopedia [retrieved May 4, 2023]. Retrieved from the Internet <https://en.wikipedia.org/wiki/Tf%E2%80%93idf>., 7 Pages.

* cited by examiner

304
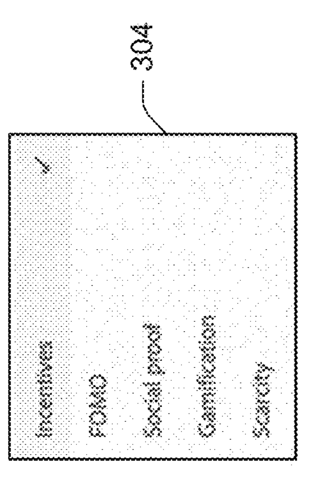
306
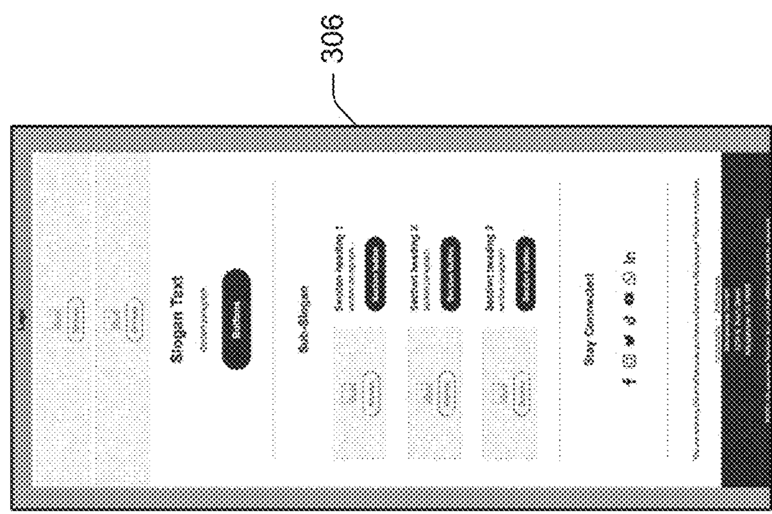
302
"Invitation to hot air balloon flying festival in Albuquerque. Join us to enjoy balloon flying, exquisite traditional food, and festive dancing."
300
Fig. 3

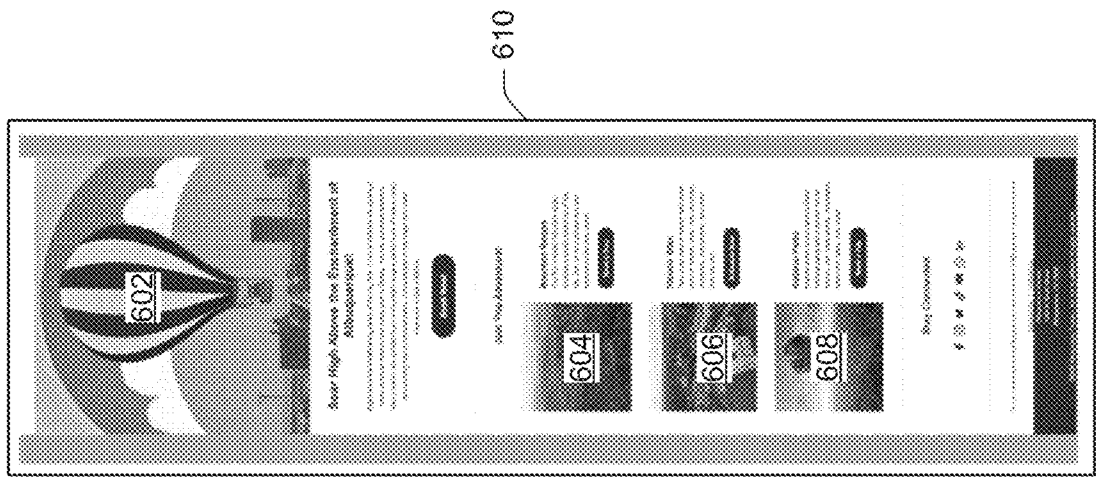
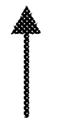
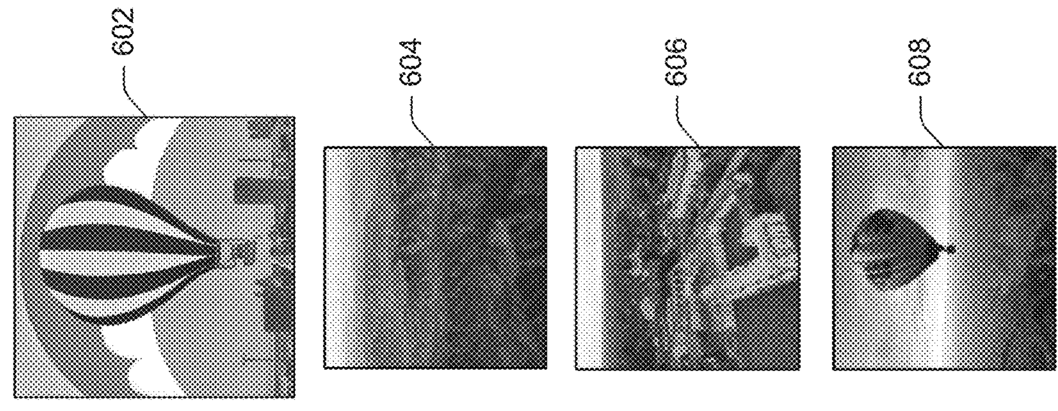
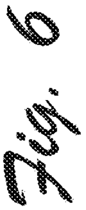
Fig. 6

Figure 7:
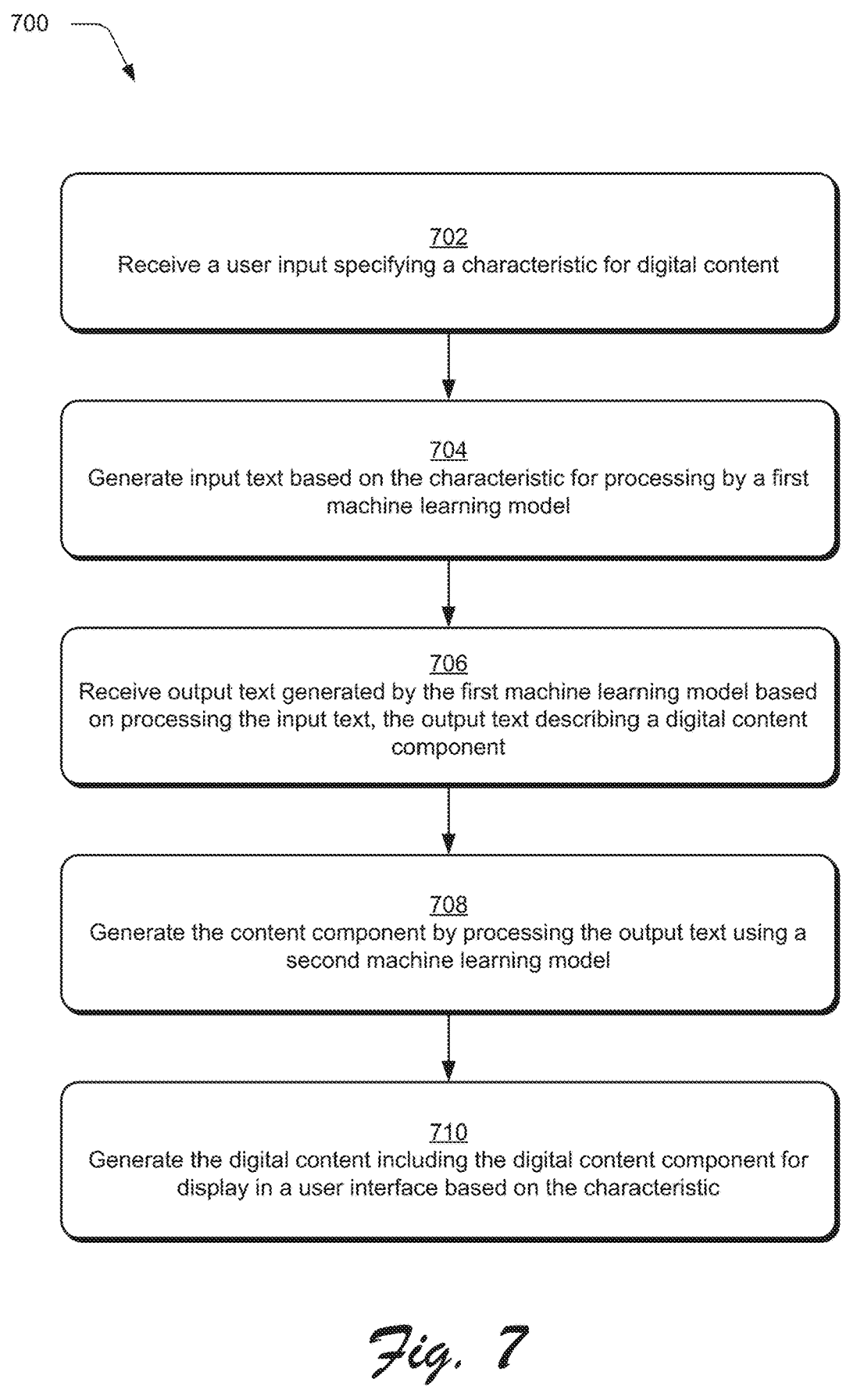

700

702
Receive a user input specifying a characteristic for digital content

704
Generate input text based on the characteristic for processing by a first machine learning model 706
Receive output text generated by the first machine learning model based on processing the input text, the output text describing a digital content component 708
Generate the content component by processing the output text using a second machine learning model 710
Generate the digital content including the digital content component for display in a user interface based on the characteristic

Figure 8:
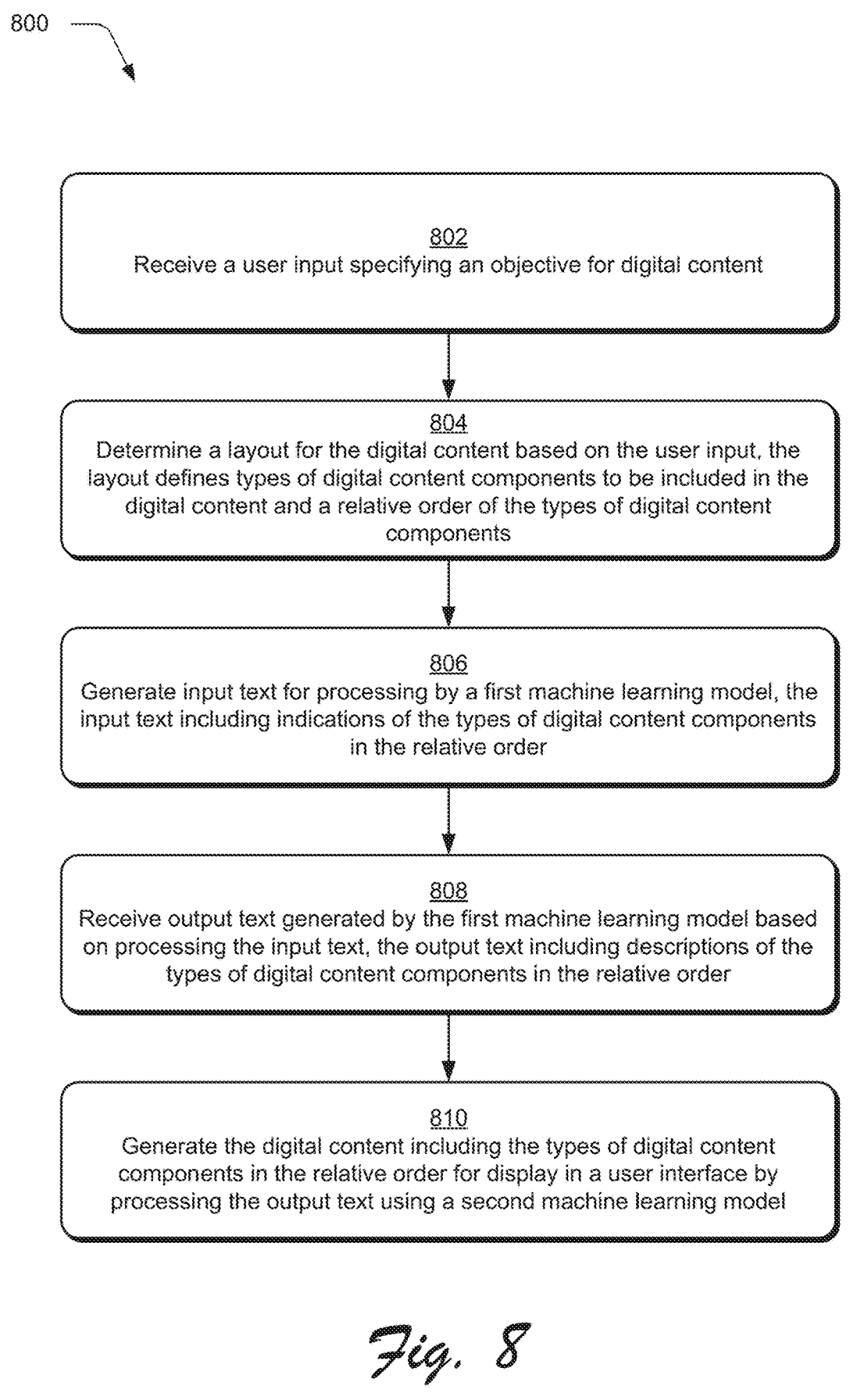

802
Receive a user input specifying an objective for digital content

804
Determine a layout for the digital content based on the user input, the layout defines types of digital content components to be included in the digital content and a relative order of the types of digital content components 806
Generate input text for processing by a first machine learning model, the input text including indications of the types of digital content components in the relative order 808
Receive output text generated by the first machine learning model based on processing the input text, the output text including descriptions of the types of digital content components in the relative order 810
Generate the digital content including the types of digital content components in the relative order for display in a user interface by processing the output text using a second machine learning model

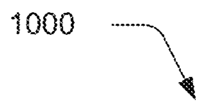
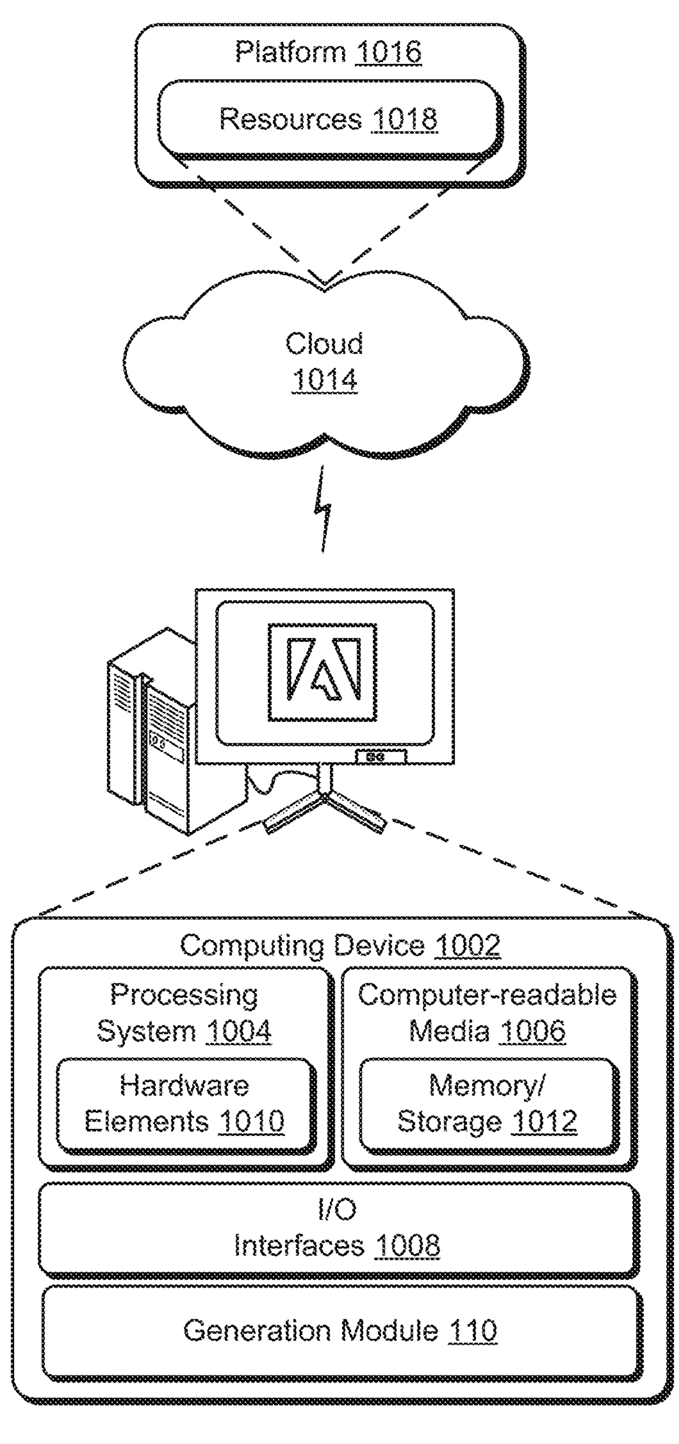
Fig. 10

GENERATING DIGITAL CONTENT

BACKGROUND

Generative machine learning models are trained on training data to generate digital content (e.g., digital images) based on natural language text inputs. Once trained, a generative machine learning model receives a text-based input such as "sun setting over the ocean," and the model generates digital content based on the input. For instance, the generative machine learning model generates a digital image depicting a sunset over a body of water based on the natural language input.

SUMMARY

Techniques and systems for generating digital content are described. In an example, a computing device implements a generation system to receive a user input specifying a characteristic for digital content that is to be generated. For example, the characteristic is a layout for the digital content, an objective of the digital content, etc. The generation system generates input text based on the characteristic for processing by a first machine learning model.

Output text generated by the first machine learning model based on processing the input text is received which describes a digital content component. The generation system generates the digital content component by processing the output text using a second machine learning model. The digital content including the digital content component is generated for display in a user interface based on the characteristic.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures Entities represented in the figures are indicative of one or more entities and thus reference is made interchangeably to single or plural forms of the entities in the discussion.

FIG. 3 illustrates a representation of identifying example content features for digital content.

FIG. 6 illustrates a representation of generated digital content components used to generate digital content.

FIG. 7 is a flow diagram depicting a procedure in an example implementation in which a user input specifying a characteristic of digital content is received and digital content is generated based on the characteristic.

FIG. 8 is a flow diagram depicting a procedure in an example implementation in which a user input specifying an objective for digital content is received and digital content is generated based on the objective.

FIG. 10 illustrates an example system that includes an example computing device that is representative of one or more computing systems and/or devices for implementing the various techniques described herein.

DETAILED DESCRIPTION

Overview

Figure 1:
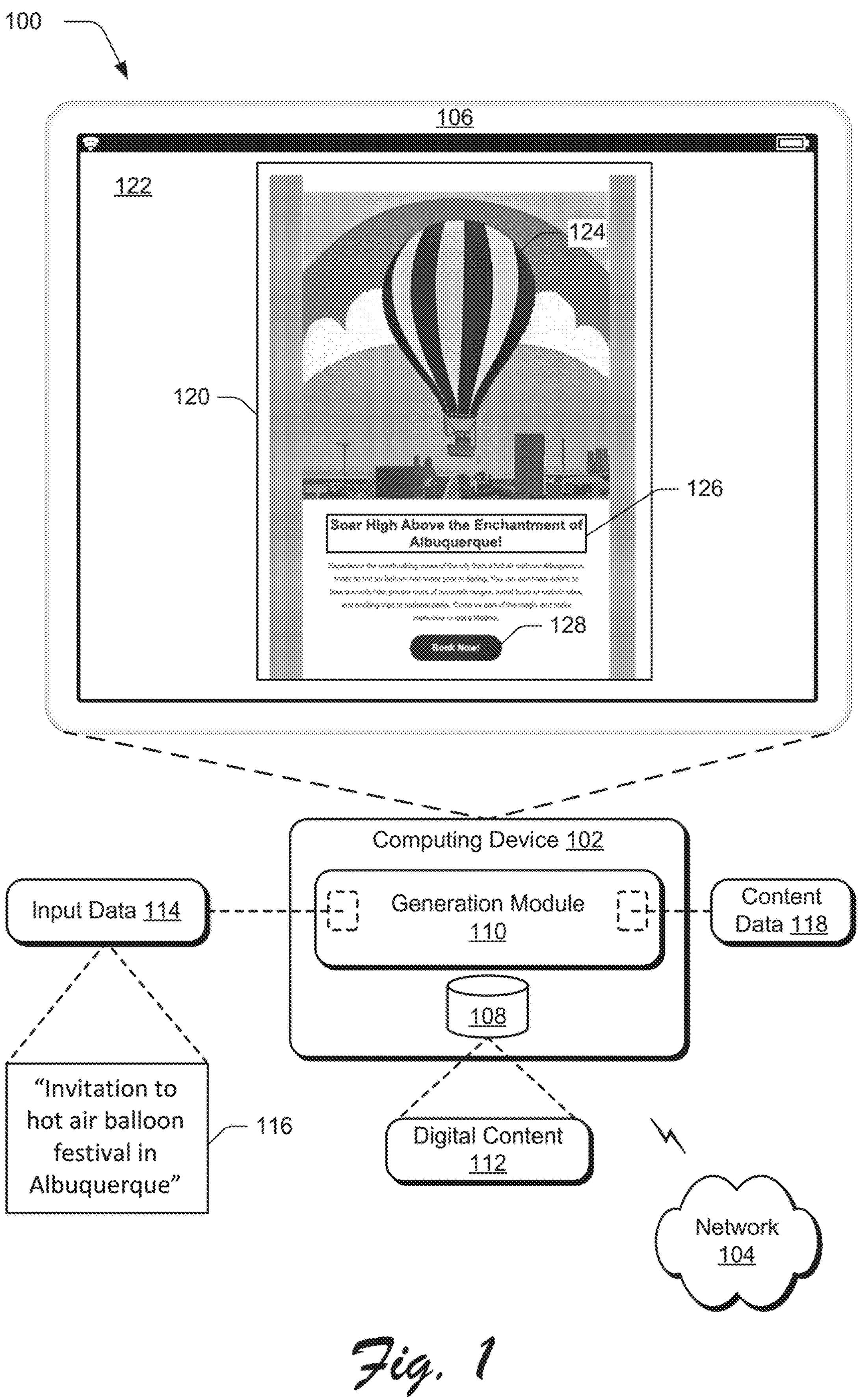
FIG. 1 is an illustration of an environment in an example implementation that is operable to employ digital systems and techniques for generating digital content as described herein.

Generative machine learning models are capable of generating digital content (e.g., digital images) based on natural language text inputs. However, conventional systems for generating digital content using generative machine learning models are limited to generating single instances of digital content such as a caption for an image or simple compositions such as an image that depicts an object and text describing the object. Conventional systems for generating digital content are not capable of generating digital content including different types of digital content components arranged in a visually pleasing and cohesive layout which is a limitation of these systems. In order to overcome this limitation, techniques and systems for generating digital content are described.

In an example, a computing device implements a generation system to receive a user input specifying a characteristic for digital content to be generated. For example, the characteristic is a theme for the digital content, an objective of the digital content, an audience to receive the digital content, etc. The generation system generates a vector representation of the characteristic to compare with vector representations of candidate layouts for digital content and vector representations of candidate strategies for achieving objectives of digital content.

In one example, the generation system compares the vector representation of the characteristic with the vector representations of the candidate layouts/strategies using locality-sensitive hashing. In this example, the generation system determines a particular layout for the digital content to be generated based on the comparison. The generation system also determines a particular strategy for achieving an objective of the digital content to be generated using the locality-sensitive hashing.

For instance, the particular layout defines a relative order of types of digital content components included in the digital content to be generated. Examples of types of digital content components include digital images, headers, footers, paragraphs of text, graphic objects, slogans of text, and so forth. The generation system generates input text for processing using a first machine learning model. In an example, the first machine learning model includes a large language model.

The input text is a prompt for the first machine learning model in a domain specific language which includes an objective for the digital content to be generated, the particular strategy for achieving the objective, and indications of the types of digital content components in the relative order. For types of digital content components that are digital images, the input text requests alternative text for images to be generated describing the digital images. The input text also includes a request to generate output text formatted using JavaScript Object Notation.

For example, the generation system receives the output text generated by the first machine learning model based on processing the input text. The output text is formatted using the JavaScript Object Notation which preserves the relative order of the types of content components. The generation system processes the output text using a second machine learning model. For instance, the second machine learning model includes a generative model which generates the digital content components that are digital images based on the alternative text for images.

The generation system generates the digital content as including the types of digital content components in the relative order for display in a user interface. In an example, the digital content includes types of content components that are digital images, slogans of text, call-to-action buttons, paragraphs of text, etc. For instance, the slogans of text have sentiments based on the objective of the digital content and/or the particular strategy for achieving the objective of the digital content.

In some examples, the generation system generates the digital content using a hypertext markup language such that the digital content is deployable without user-performed modifications to the digital content. This is not possible using conventional systems for generating digital content which are limited to generating digital content in simple compositions that must be manually composited and arranged into multimodal digital content by a user. The described systems for generating digital content are also capable of automatically generating digital content including different types of content components arranged in a specific layout based on a specified theme or brand requirements which is also not possible using the conventional systems.

Term Examples

As used herein, the term "digital content" refers to a group of content components having an associated objective. Examples of digital content include digital pamphlets, digital flyers, instances of electronic mail communications, etc.

As used herein, the term "content component" refers to a definable element of content which is combinable with additional content components as an instance of digital content. Examples of content components include digital images, digital videos, graphic objects, headers, footers, slogans of text (e.g., less than 10 words rendered using a font having a weight greater than 700), lines of text, paragraphs of text, call-to-action buttons, and so forth.

As used herein, the term "objective" for digital content refers to an intent or a purpose for the digital content. Examples of objectives for digital content include a call-to-action such as to increase support for preventing climate change, an invitation such as to attend a particular event, an information dissemination such as to inform users of available new features of an application for editing digital content, etc.

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, transformers, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. For example, the computing device 102 includes a storage device 108 and a generation module 110. The storage device 108 is illustrated to include digital content 112 such as digital images, digital artwork, digital videos, etc.

The generation module 110 is illustrated as having, receiving, and/or transmitting input data 114 describing a characteristic 116 for digital content. For instance, the digital content is to be generated by the generation module 110 and the characteristic 116 indicates an objective for the digital content and/or how to generate the digital content. In the illustrated example, the characteristic 116 is a natural language statement of "Invitation to hot air balloon festival in Albuquerque." In this example, the characteristic 116 is an objective of the digital content (e.g., to invite pilots/passengers/observers of hot air balloons to a festival in Albuquerque).

For example, the generation module 110 receives and processes the input data 114 to generate a vector representation of the characteristic 116. In some examples, the generation module 110 includes or has access to a machine learning model trained on training data to generate vector representations of natural language statements, and the generation module 110 implements the machine learning model to generate the vector representation of the characteristic 116. In other examples, the generation module 110 generates the vector representation of the characteristic 116 using a hash function such as a locality-sensitive hash function. For example, the generation module 110 leverages the vector representation of the characteristic 116 to identify candidate layouts and/or candidate strategies for achieving the objective of the digital content that is to be generated.

To do so in one example, the generation module 110 is illustrated as having, receiving, and/or transmitting content data 118. The content data 118 describes information related to instances of digital content 112 such as whether or not the instances of digital content 112 achieved corresponding objectives for the instances of digital content 112. For example, the content data 118 describes vector representations of candidate layouts as well as vector representations of candidate strategies for achieving objectives of instances of digital content 112.

Consider an example in which the generation module 110 processes the input data 114 and the content data 118 to compare the vector representation of the characteristic 116 with the vector representations of candidate layouts using locality-sensitive hashing. In this example, the generation module 110 identifies a particular layout or a set of particular candidate layouts based on a similarity between the characteristic 116 and the particular layout or the particular candidate layouts. In a similar example, the generation module 110 processes the input data 114 and the content data 118 to compare the vector representation of the characteristic 116 with the vector representations of candidate strategies using locality-sensitive hashing. For instance, the generation module 110 identifies a particular strategy or a set of particular candidate strategies based on a similarity between the characteristic 116 and the particular strategy or the particular candidate strategies.

Consider another example in which the particular layout represented by the vector representation described by the content data 118 is also described by the content data 118 or included in digital content 112 that is available to the generation module 110. For example, the particular layout defines types of digital content components to be included in the digital content to be generated by the generation module 110 and a relative order of the types of digital content components. In an example, the generation module 110 generates input text for processing by a first machine learning model. In this example, the input text includes indications of the types of digital content components in the relative order. For instance, the input text also includes the characteristic 116 which is the objective of the digital content to be generated by the generation module 110 (e.g., to invite pilots and passengers of hot air balloons to a festival in Albuquerque).

In some examples, the first machine learning model is a large language model capable of performing a variety of different natural language tasks after being trained on corpuses of training data. In an example, the input text includes a request for the first machine learning model to generate output text based on the input text such that the output text is formatted in JavaScript Object Notation. In examples in which the types of digital content components include digital images, the generation module 110 generates the input text as including requests for alternative text for the digital images. In these examples, the alternative text describes objects depicted in the digital images, visual themes of the digital images, objectives/purposes of the digital images, and so forth.

The first machine learning model is included in or available to the generation module 110, and the generation module 110 implements the first machine learning model to process the input text. For example, the generation module 110 receives the output text generated by the first machine learning model based on processing the input text, and the output text is formatted in the JavaScript Object Notation. For instance, the output text includes descriptions of the types of digital content components in the relative order. The output text also includes alternative text generated for the types of digital content components that are digital images.

In some examples, the generation module 110 confirms that the output text is formatted in the JavaScript Object Notation. The generation module 110 includes or has access to a second machine learning model which is a generative machine learning model such as a diffusion model or a system of generative machine learning models. For example, the second machine learning model is trained on training data to generate digital images based on natural language text describing the digital images (e.g., by representing the digital images and the natural language text in a same latent space).

In an example, the generation module 110 implements the second machine learning model to process the output text (e.g., the second machine learning model processes the alternative text included in the output text for the types of digital content components that are digital images) in order to generate digital content components such as digital images which are different from but similar to the types of digital content components that are digital images. For example, the generated digital content components are visually similar to the types of content components that are digital images (e.g., depicting similar colors or themes), semantically similar to the types of content components that are digital images (e.g., depicting objects with semantically similar classifications), etc. In one example, the generation module 110 composites the generated digital content components (e.g., based on the relative order) as generated digital content 120 which is displayed in a user interface 122 of the display device 106.

As shown, the generated digital content 120 is an invitation to a hot air balloon festival in Albuquerque which corresponds to the characteristic 116 described by the input data 114. For instance, the generated digital content 120 includes a generated digital content component that is a digital image such as a hero image depicting a hot air balloon 124. The generated digital content 120 also includes a generated digital content component which is natural language text 126 that states "Soar High Above the Enchantment of Albuquerque!"

Notably, the natural language text 126 has a sentiment based on the objective and/or the particular strategy (e.g., an excited sentiment to encourage attendance of the hot air balloon festival). In the illustrated example, the generated digital content 120 includes a generated digital content component which is a call-to-action button 128 to "Book Now!" The text of the call-to-action button 128 also has a sentiment based on the objective and/or the particular strategy (e.g., register quickly to avoid missing the hot air balloon festival). By leveraging both the first machine learning model and the second machine learning model, the generation module 110 is capable of generating the generated digital content 120 as including multiple different types of digital content components (e.g., digital images, text, graphic objects, etc.)

Consider an example in which a user interacts with an input device (e.g., a mouse, a keyboard, a microphone, a stylus, a touchscreen, etc.) to modify the input data 114 by modifying the characteristic 116 and replacing "hot air balloon festival" with "farmer's market." In this example, the generation module 110 receives the modified input data 114 and replaces the generated digital content 120 with an invitation to a farmer's market in Albuquerque which includes a digital image depicting fresh fruit and vegetables (e.g., instead of the hot air balloon 124). By receiving the modified input data 114 with different natural language describing digital content to be generated, the generation module 110 is capable of generating digital content such as the generated digital content 120 that maintains a specified theme and/or brand requirements. This is not possible using conventional systems that are limited to generating digital content that has an arbitrary appearance or that has a visual appearance that is based on a specific set of training data.

Figure 2:
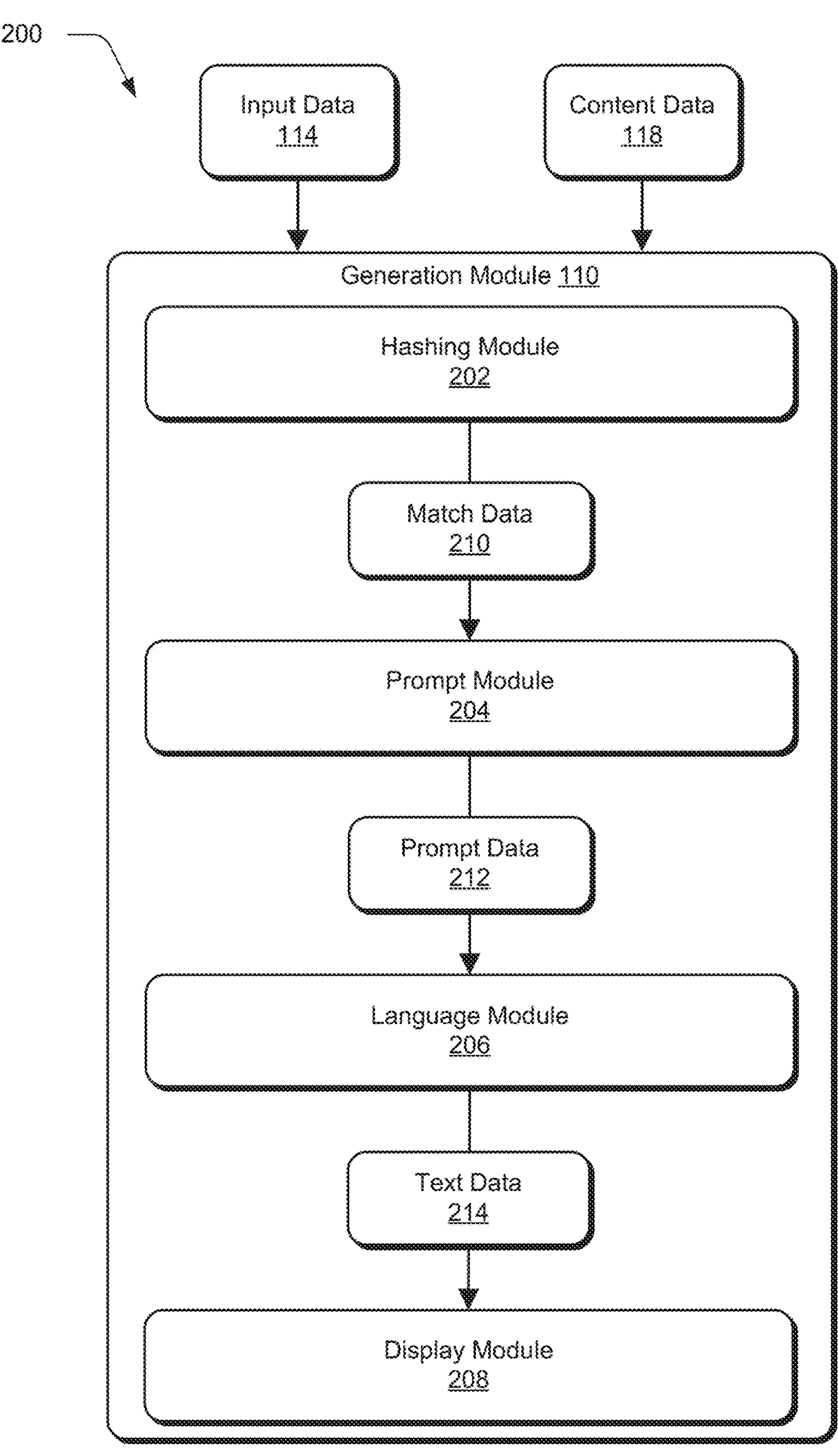
FIG. 2 depicts a system in an example implementation showing operation of a generation module for generating digital content.

FIG. 2 depicts a system 200 in an example implementation showing operation of a generation module 110. The generation module 110 is illustrated to include a hashing module 202, a prompt module 204, a language module 206, and a display module 208. For example, the hashing module 202 receives and processes the input data 114 and the content data 118 in order to generate match data 210.

FIG. 3 illustrates a representation 300 of identifying example content features for digital content. For instance, the hashing module 202 receives the input data 114 as describing an objective 302 for digital content to be generated. The objective 302 is a natural language statement of "Invitation to hot air balloon flying festival in Albuquerque. Join us to enjoy balloon flying, exquisite traditional food, and festive dancing." For example, the hashing module 202 receives and processes the input data 114 to generate a vector representation of the objective 302.

In some examples, the hashing module 202 generates the vector representation of the objective 302 using a natural language processing model trained on training data to generate vector representations of natural language text. In other examples, the hashing module 202 generates the vector representation of the objective 302 using a locality-sensitive hash function (or hash functions). For example, the hashing module 202 generates the vector representation of the objective 302 using a data-independent technique for representing natural language text in a latent space or an embedding space. In one example, the hashing module 202 generates the vector representation of the objective 302 using a term frequency-inverse document frequency technique. In another example, the hashing module 202 generates the vector representation of the objective 302 using natural language processing feature extracting techniques or a bag of words representation.

Consider an example in which the hashing module 202 includes a machine learning predictor model trained on training data to receive inputs and generate content characteristics and/or content components based on the inputs such as communication strategies for digital content, layouts for digital content, etc. To do so in one example, the hashing module 202 compares the vector representation of the objective 302 with the vector representations of the candidate layouts described by the content data 118. For instance, the hashing module 202 also compares the vector representation of the objective 302 with the vector representations of the candidate strategies for achieving objectives of digital content described by the content data 118. Although the hashing module 202 is illustrated as receiving the input data 114 as describing the objective 302 for digital content to be generated in the representation, it is to be appreciated that the hashing module 202 is also capable of receiving the input data 114 as describing a specific audience to receive the digital content to be generated, a generic audience to receive the digital content to be generated, a natural language prompt describing the digital content to be generated, an offer associated with the digital content to be generated, and so forth.

In a first example, the candidate layouts are selected from a corpus of layouts of digital content based on an association with instances of digital content which achieved corresponding objectives for the instances of digital content (e.g., resulted in highly attended events, received greater than a threshold number of user interactions, etc.). In the first example, the candidate strategies for achieving objectives of digital content are selected from a corpus of strategies based on an association with instances of digital content which achieved corresponding objectives. In a second example, the candidate layouts described by the content data 118 include each layout included in the corpus of layouts of digital content. In the second example, the candidate strategies for achieving objectives of digital content described by the content data 118 include each strategy included in the corpus of strategies.

In an example, the hashing module 202 compares the vector representation of the objective 302 with the vector representations of the candidate strategies for achieving objectives of digital content described by the content data 118 using locality-sensitive hashing to identify candidate strategies 304. In the illustrated example, the candidate strategies 304 include a top N candidate strategies including "Incentives," "FOMO," "Social proof," "Gamification," and "Scarcity." For example, a checkmark indicates that a particular strategy for achieving the objective 302 for digital content to be generated is "Incentives."

The hashing module 202 compares the vector representation of the objective 302 with the vector representations of the candidate layouts described by the content data 118 using locality-sensitive hashing to identify a top N candidate layouts. In one example, the hashing module 202 identifies a particular layout for the digital content to be generated based on the locality-sensitive hashing. In this example, the particular layout is defined in a digital template 306. For instance, the hashing module 202 generates the match data 210 as describing "Incentives" from the candidate strategies 304 and the digital template 306. Although the hashing module 202 is illustrated as generating the match data 210 describing the candidate strategies 304 and the digital template 306, it is to be appreciated that the hashing module 202 is also capable of generating the match data 210 as describing other content features for digital content such as tonality, colors (e.g., color pallets), image features, etc.

Figure 4:
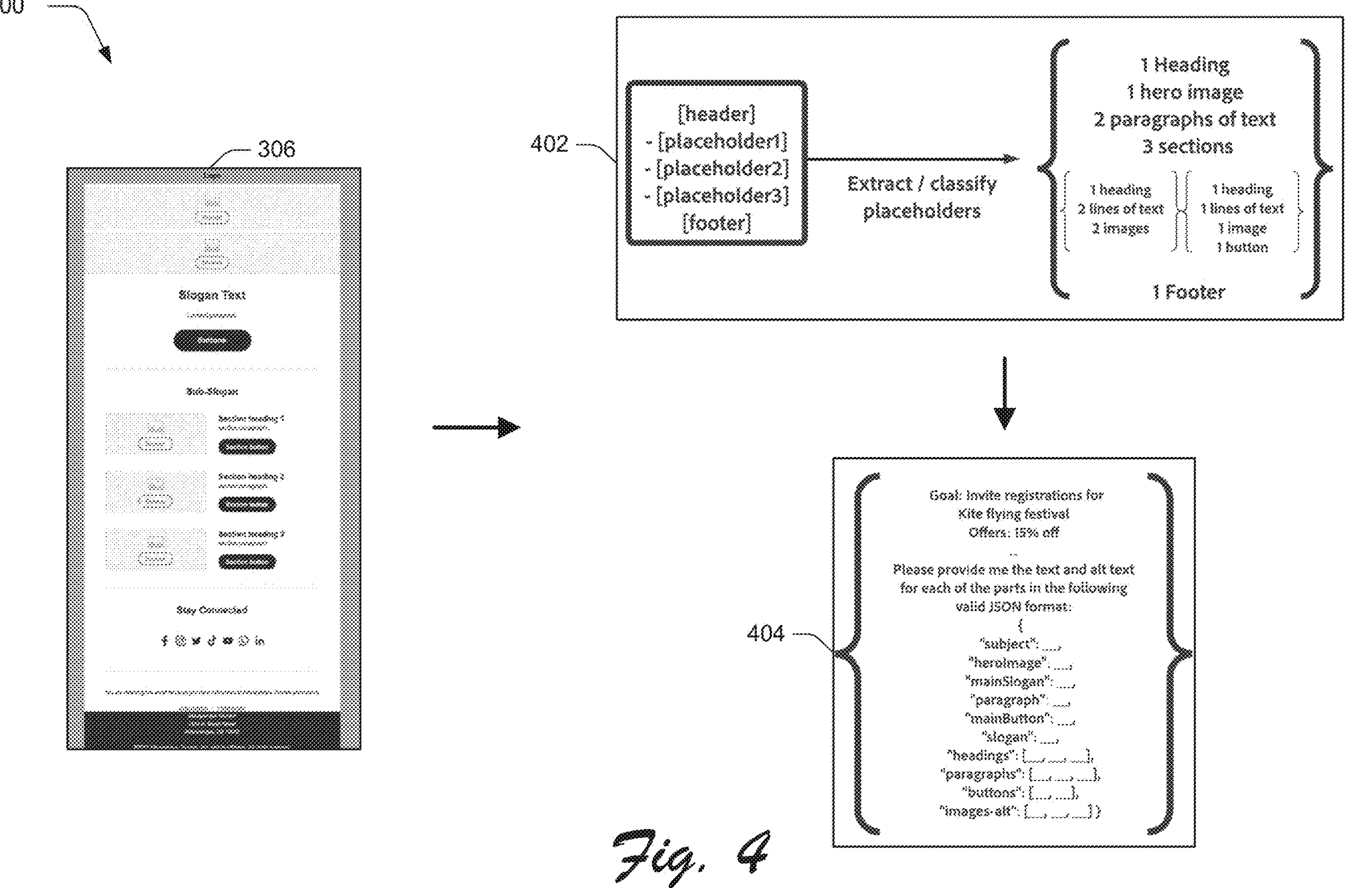
FIG. 4 illustrates a representation of generating input text.

The prompt module 204 receives and processes the match data 210 in order to generate prompt data 212. FIG. 4 illustrates a representation 400 of generating input text. As shown, the representation 400 includes the digital template 306 described by the match data 210, and the prompt module 204 parameterizes the particular layout with placeholders 402 which will be replaced by digital content components generated using the second machine learning model. The prompt module 204 classifies the placeholders 402 into types of digital content components such as digital images, slogans (e.g., lines of text with less than 10 words rendered using a font having a weight greater than 700), paragraphs of text, headings/headers, footers, call-to-action buttons, etc. The prompt module 204 also classifies content blocks of the particular layout which include digital images and/or text.

After classifying the placeholders 402 as types of digital content components, the prompt module 204 includes the types of digital content components in input text 404 to be processed by the first machine learning model. For types of the digital content components that are digital images, the input text 404 requests alternative text describing the digital images. The input text 404 includes portions of the objective 302 such as natural language text stating "Invite registrations for kite flying festival." As shown, the input text 404 also includes a discount of "15% off" based on the particular strategy for achieving the objective 302 of "Incentives." The prompt module 204 generates the input text 404 as including a request for the first machine learning model to generate output text formatted using JavaScript Object Notation. The JavaScript Object Notation encodes a relative order of the types of digital content components defined by the particular layout of the digital template 306.

Figure 5:
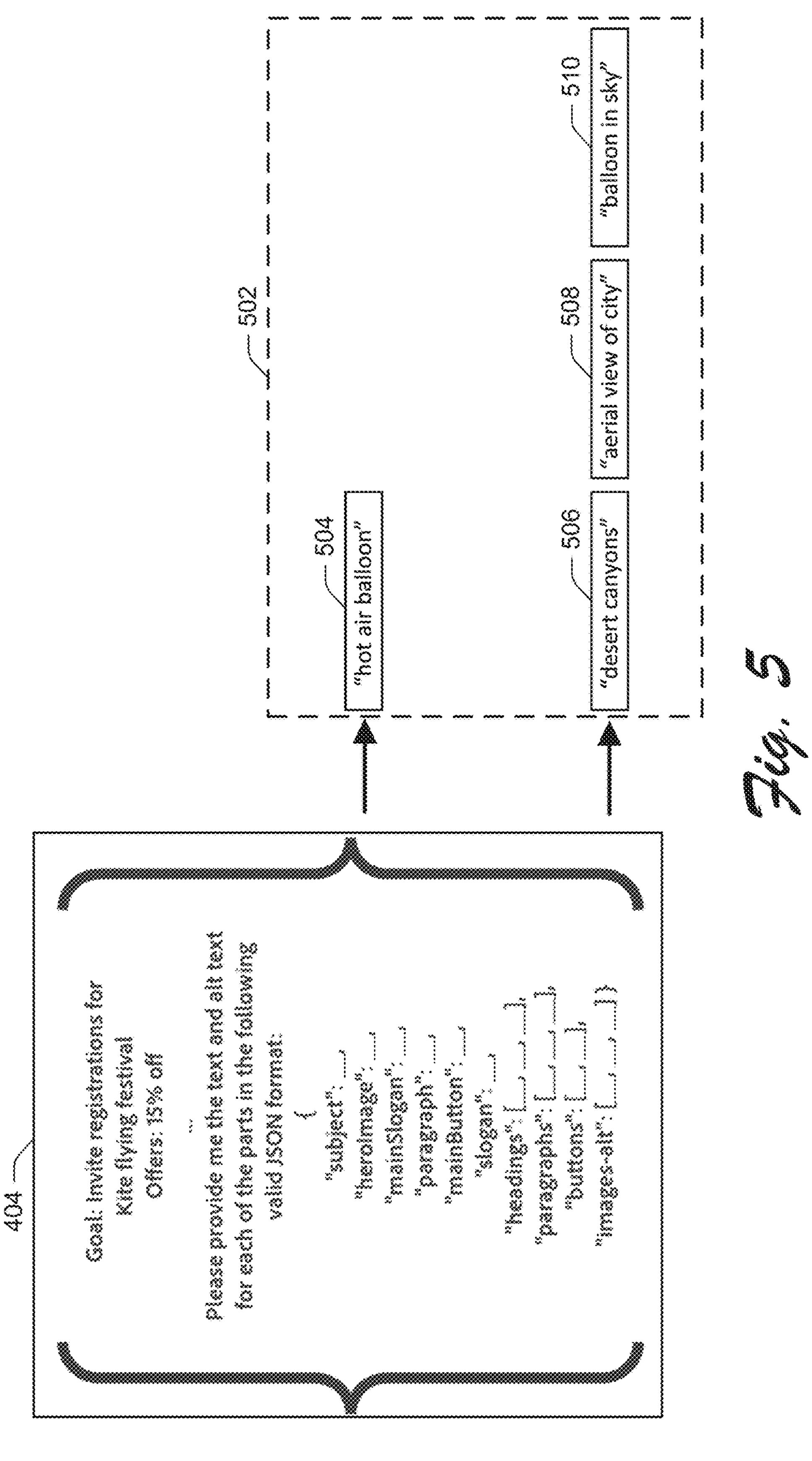
FIG. 5 illustrates a representation of generating output text by processing input text.

For example, the prompt module 204 generates the prompt data 212 as describing the input text 404. The language module 206 receives and processes the prompt data 212 in order to generate text data 214. FIG. 5 illustrates a representation 500 of generating output text by processing input text. As shown, the representation 500 includes the input text 404.

The language module 206 includes or has access to the first machine learning model which includes the large language model. In an example, the language module 206 implements the first machine learning model to generate output text 502 in the JavaScript Object Notation format by processing the input text 404. For example, the output text 502 includes alternative text 504 for a type of digital content component that is a first digital image. In this example, the alternative text 504 is "hot air balloon." For instance, the alternative text 504 describes an object.

The output text 502 also includes alternative text 506 for a type of digital content component that is a second digital image; alternative text 508 for a type of digital content component that is a third digital image; and alternative text 510 for a type of digital content component that is a fourth digital image. The alternative text 506 is "desert canyons;" the alternative text 508 is "aerial view of city;" and the alternative text 510 is "balloon in sky." The language module 206 generates the text data 214 as describing the output text 502.

FIG. 6 illustrates a representation 600 of generated digital content components used to generate digital content. The display module 208 receives the text data 214 describing the output text 502. For example, the display module 208 includes or has access to the second machine learning model which includes a generative machine learning model. Examples of generative machine learning models included in the second machine learning model include a model trained on training data to generate digital images, a diffusion model, a Generative Pre-Trained Transformer 4 model (GPT-4), a Hierarchical Text-Conditional Image Generation with CLIP Latents model (DALLE 2), etc. In some examples, the second machine learning model includes systems of generative machine learning models.

In an example, the display module 208 implements the second machine learning module to generate digital content components 602-608 by processing the output text 502. For instance, the display module 208 generates digital content component 602 using the second machine learning model based on the alternative text 504 of "hot air balloon." As shown in the representation 600, the digital content component 602 is a digital image that depicts a hot air balloon.

The display module 208 generates digital content component 604 based on the alternative text 506 of "desert canyons," and the digital content component 604 is a digital image depicting a desert landscape with canyons. Similarly, the display module 208 generates digital content component 606 using the alternative text 508 of "aerial view of city." As shown in FIG. 6, the digital content component 606 is a digital image that depicts a portion of a town viewed from a high elevation. Finally, the display module 208 generates digital content component 608 based on the alternative text 510 of "balloon in sky," and the digital content component 608 is a digital image depicting a hot air balloon flying in the sky.

In order to generate digital content 610 that includes the digital content components 602-608, the display module 208 leverages the relative order of the types of digital content components defined by the particular layout of the digital template 306 which is also encoded in the output text 502 in the JavaScript Object Notation format. Using this relative order, the display module 208 generates the digital content 610 as including the digital content component 602 as a hero image and including the digital content components 604-608 as section images. In an example, the display module 208 generates the digital content 610 using a hypertext markup language such that the digital content 610 is includable in electronic communications for receipt by hot air balloon pilots/passengers/observers.

By utilizing the first machine learning model to generate alternative text for digital images and utilizing the second machine learning model to generate digital images based on the alternative text, the generation module 110 is capable of generating digital content such as the digital content 610 which includes different types of content components such as digital images, lines of text, graphic objects, call-to-action buttons, and so forth. Further, by encoding the relative order of types of digital content components using the JavaScript Object Notation format, the generation module 110 is also capable of generating digital content having digital content components arranged in a visually pleasing manner in accordance with a particular theme or style. This is not possible using conventional systems for generating digital content that are limited to generating a single type of digital content (e.g., a digital image) which must be manually arranged relative to other types of digital content.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6. FIG. 7 is a flow diagram depicting a procedure 700 in an example implementation in which a user input specifying a characteristic of digital content is received and digital content is generated based on the characteristic.

A user input is received specifying a characteristic for digital content (block 702). In some examples, the computing device 102 implements the generation module 110 to receive the user input. Input text is generated based on the characteristic for processing by a first machine learning model (block 704). For example, the generation module 110 generates the input text. Output text is received that is generated by the first machine learning model based on processing the input text, and the output text describes a digital content component (block 706). In an example, the generation module 110 generates the output text using the first machine learning model.

The content component is generated by processing the output text using a second machine learning model (block 708). In one example, the computing device 102 implements the generation module 110 to generate the content component using the second machine learning model. The digital content is generated as including the digital content component for display in a user interface based on the characteristic (block 710). For example, the generation module 110 generates the digital content including the digital content component for display in the user interface.

FIG. 8 is a flow diagram depicting a procedure 800 in an example implementation in which a user input specifying an objective for digital content is received and digital content is generated based on the objective. A user input specifying an objective for digital content is received (block 802). In one example, the computing device 102 implements the generation module 110 to receive the user input. A layout for the digital content is determined based on the user input, the layout defines types of digital content components to be included in the digital content and a relative order of the types of digital content components (block 804). In some examples, the generation module 110 determines the layout for the digital content.

Input text is generated for processing by a first machine learning model, the input text including indications of the types of digital content components in the relative order (block 806). In an example, the computing device 102 implements the generation module 110 to generate the input text. Output text generated by the first machine learning model based on processing the input text is received, the output text including descriptions of the types of digital content components in the relative order (block 808). The generation module 110 causes the first machine learning model to generate the output text in some examples. The digital content is generated as including the types of digital content components in the relative order for display in a user interface by processing the output text using a second machine learning model (block 810). For example, the generation module 110 causes the second machine learning model to generate the digital content for display in the user interface.

Figure 9A:
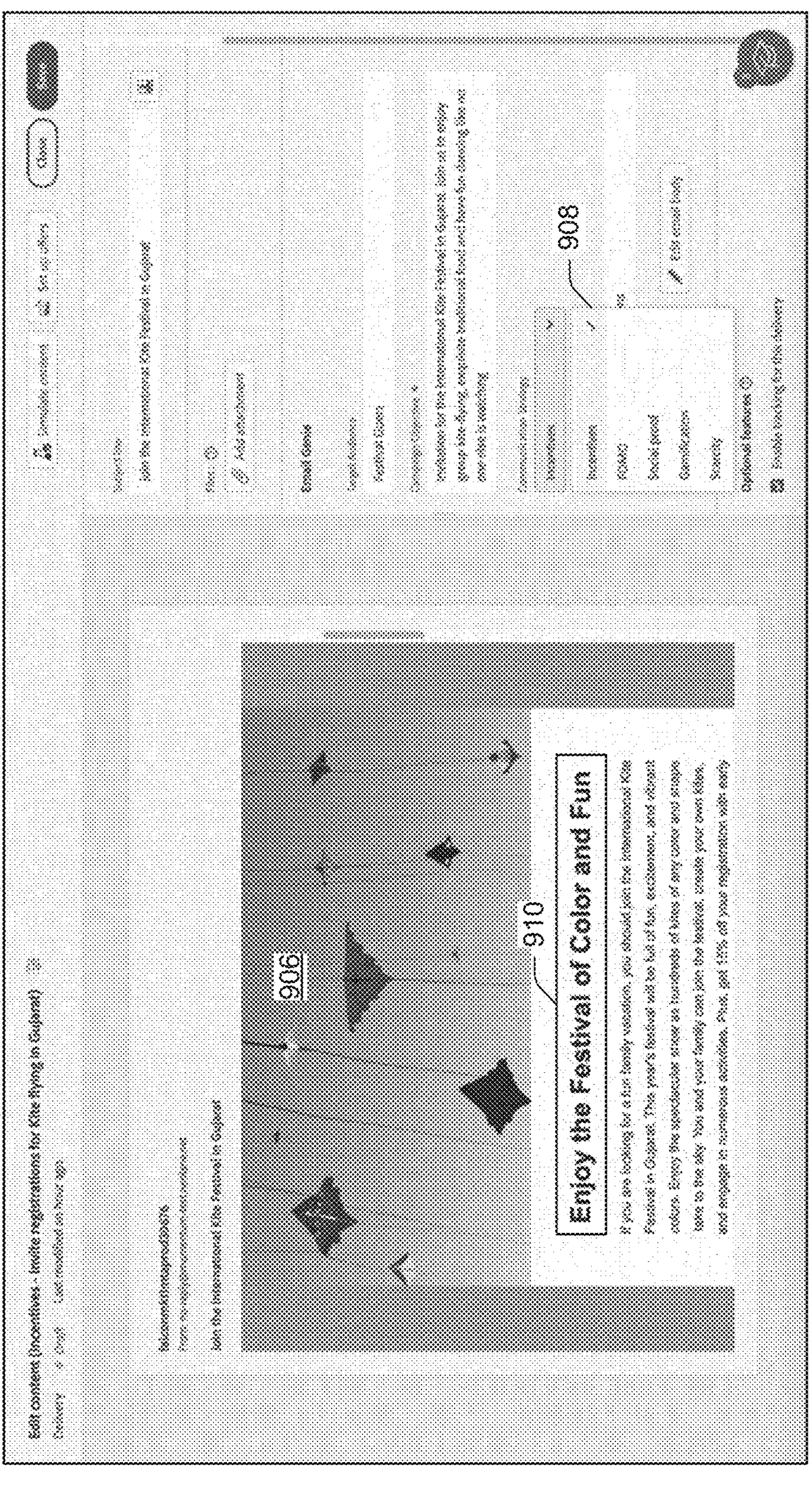
FIGS. 9A, 9B, and 9C illustrate examples of user interfaces for generating digital content.
Figure 9B:
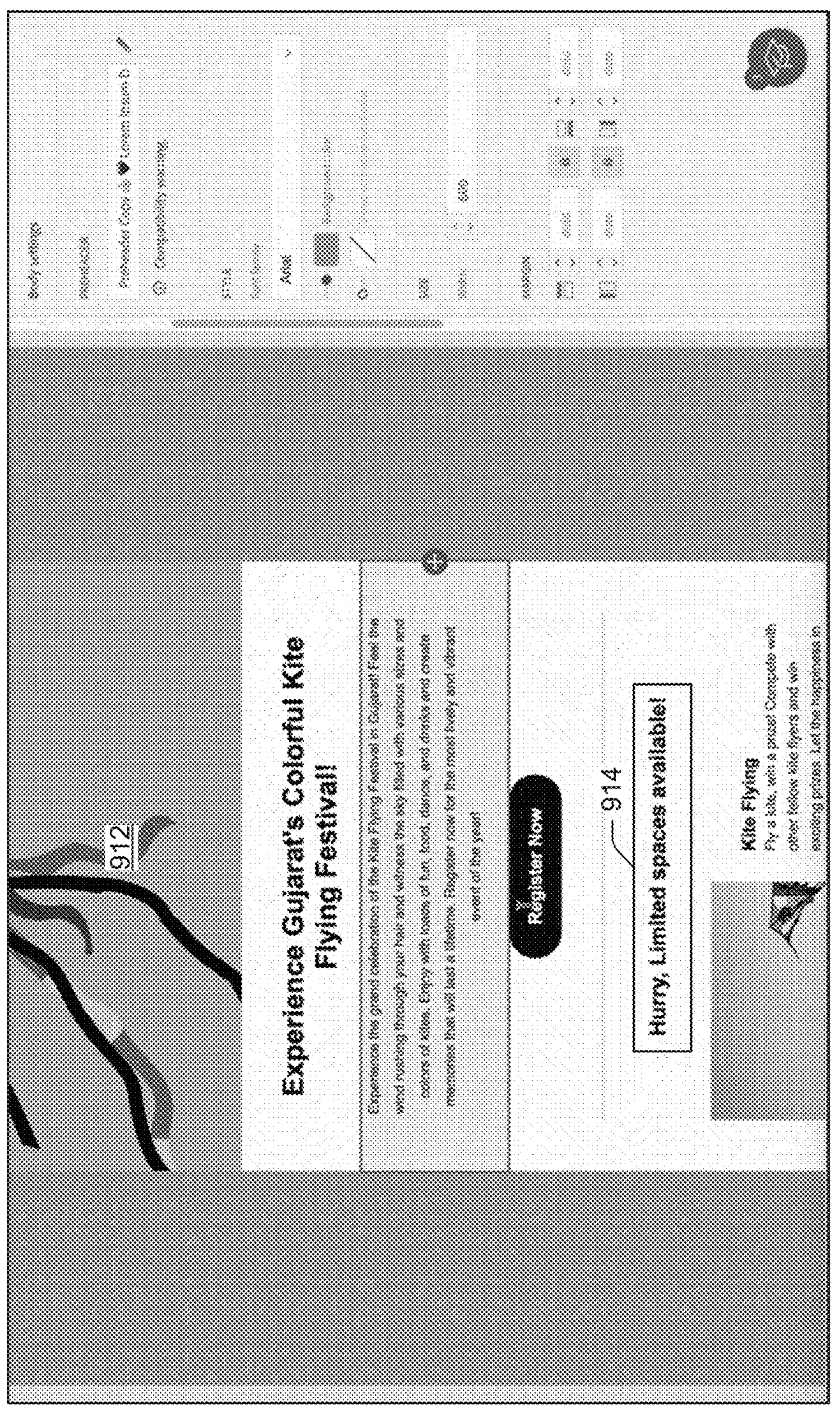
Figure 9C:
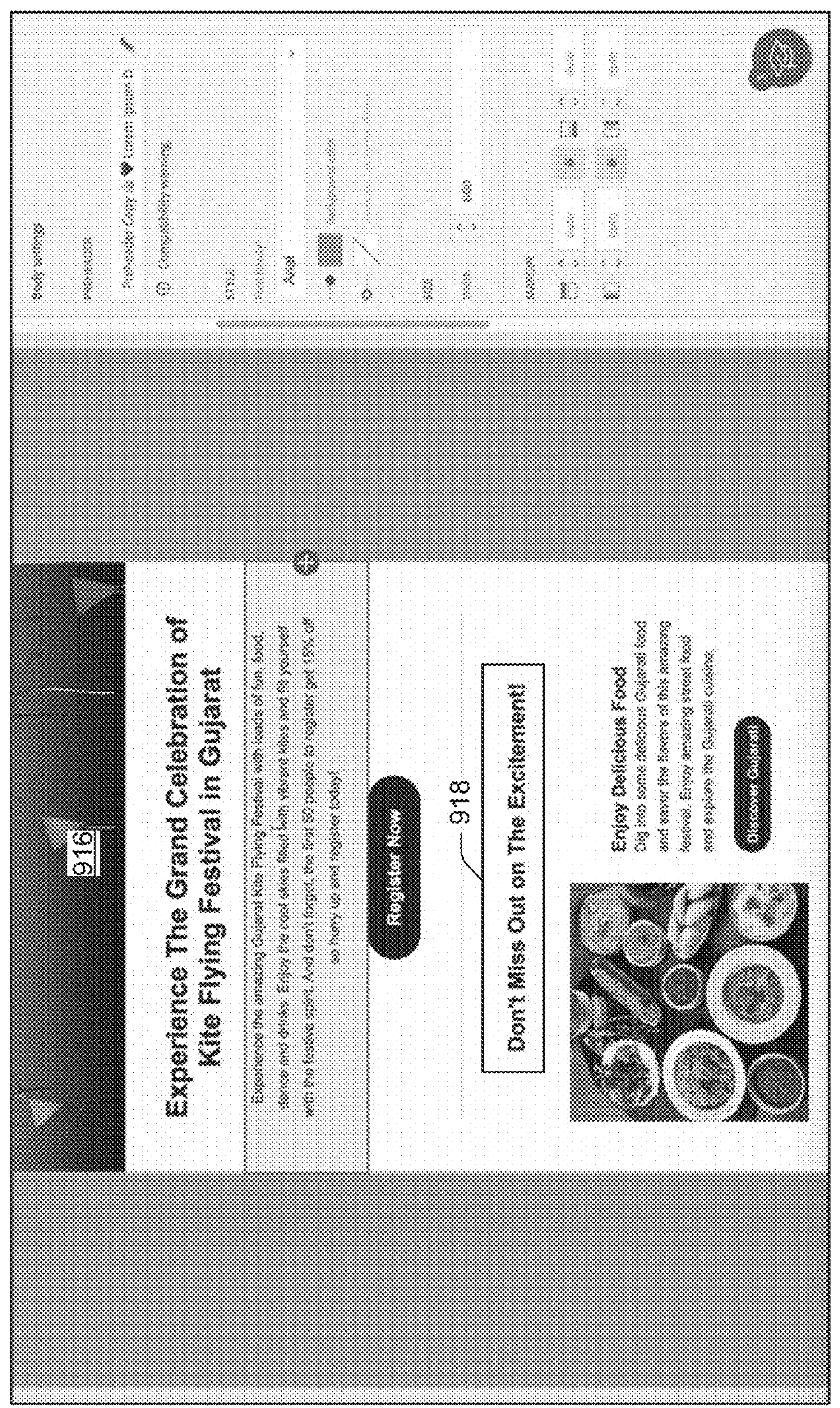

FIGS. 9A, 9B, and 9C illustrate examples of user interfaces for generating digital content. FIG. 9A illustrates a representation 900 of digital content generated using a first strategy. FIG. 9B illustrates a representation 902 of digital content generated using a second strategy. FIG. 9C illustrates a representation 904 of digital content generated using a third strategy.

With reference to FIG. 9A, the representation 900 includes digital content generated having a digital content component 906 which is a digital image depicting kites flying in the sky. A user manipulates an input device (e.g., a mouse, a stylus, a keyboard, a touchscreen, etc.) to interact with a user interface element 908 by selecting "Incentives" as a strategy for achieving an objective of the digital content. Based on the selected strategy, the digital content includes a digital content component 910 which is a slogan that states "Enjoy the Festival of Color and Fun." As shown, the digital content component 910 is above additional text which indicates "get 15% off of your registration."

With respect to FIG. 9B, the representation 902 includes digital content having a digital content component 912. The digital content component 912 is a digital image depicting streamers of a flying kite. For example, the user manipulates the input device to interact with the user interface element 908 by selecting "Scarcity" as a strategy for achieving an objective of the digital content. In response to selecting this strategy, the generation module 110 causes the digital content to include a digital content component 914. The digital content component 914 is a slogan stating "Hurry, Limited spaces available!"

With reference to FIG. 9C, the representation 904 includes digital content having a digital content component 916 which is a digital image depicting small kites in the sky. For instance, the user manipulates the input device to interact with the user interface element 908 by selecting "FOMO" as a strategy for achieving an objective of the digital content. In response to selecting fear of missing out as the strategy, the generation module 110 causes the digital content to include a digital content component 918. As shown, the digital content component 918 is a slogan which states "Don't Miss Out on The Excitement!"

Example System and Device

FIG. 10 illustrates an example system 1000 that includes an example computing device that is representative of one or more computing systems and/or devices that are usable to implement the various techniques described herein. This is illustrated through inclusion of the generation module 110. The computing device 1002 includes, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that are configured as processors, functional blocks, and so forth. This includes example implementations in hardware as an application specific integrated circuit or other logic device formed using one or more semiconductors. The hardware elements 1010 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1006 is illustrated as including memory/storage 1012. The memory/storage 1012 represents memory/storage capacity associated with one or more computer-readable media. In one example, the memory/storage 1012 includes volatile media (such as random access memory (RAM)) and/or nonvolatile media (such as read only memory (ROM), Flash memory, optical disks, magnetic disks, and so forth). In another example, the memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1010. For example, the computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supportable by various configurations of the computing device 1002 and are not limited to the specific examples of the techniques described herein. This functionality is also implementable entirely or partially through use of a distributed system, such as over a "cloud" 1014 as described below.

The cloud 1014 includes and/or is representative of a platform 1016 for resources 1018. The platform 1016 abstracts underlying functionality of hardware (e.g., servers) and software resources of the cloud 1014. For example, the resources 1018 include applications and/or data that are utilized while computer processing is executed on servers that are remote from the computing device 1002. In some examples, the resources 1018 also include services provided over the Internet and/or through a subscriber network, such as a cellular or Wi-Fi network.

The platform 1016 abstracts the resources 1018 and functions to connect the computing device 1002 with other computing devices. In some examples, the platform 1016 also serves to abstract scaling of resources to provide a corresponding level of scale to encountered demand for the resources that are implemented via the platform. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

CONCLUSION

Although implementations of systems generating digital content have been described in language specific to structural features and/or methods, it is to be understood that the appended claims are not necessarily limited to the specific features or methods described. Rather, the specific features and methods are disclosed as example implementations of systems for generating digital content, and other equivalent features and methods are intended to be within the scope of the appended claims. Further, various different examples are described and it is to be appreciated that each described example is implementable independently or in connection with one or more other described examples.

What is claimed is:

1. A method comprising:

receiving, by a processing device, a user input specifying a characteristic for digital content; and causing, by the processing device, generation of digital content automatically by a generative model based on the user input, the digital content including a plurality of digital content components, the causing including:

determining a layout for the digital content by comparing a vector representation of the user input in an embedding space with vector representations of candidate layouts for the digital content, the embeddings generated using a natural language processing model;

causing generation of input text based on the characteristic and types of digital content and a relative order specified by the layout for processing by a language model;

receiving data in a structured object format from the language model based on processing the input text, the data describing the digital plurality of digital content components in the relative order and including alternative text generated by the language model describing an additional one or more objects to be depicted in a digital image as a respective said component; and causing generation of the digital content based on the characteristic by processing the data in the structured object format by the generative model, the digital content including the one or more objects as depicted in the digital image generated based on the alternative text as part of the plurality of digital content components having the types of digital content and compositing the plurality of digital content components in the relative order.

2. The method as described in claim 1, wherein the characteristic is a layout and the digital content component is ordered in the digital content relative to an additional digital content component based on the layout.

3. The method as described in claim 1, wherein the characteristic is an objective of the digital content and the digital content component includes natural language text having a sentiment based on the objective.

4. The method as described in claim 1, wherein the data includes the alternative text for the digital image that describes the object and the digital content component is the digital image that depicts the object.

5. The method as described in claim 1, wherein the language model includes a large language model.

6. The method as described in claim 1, wherein the layout for the digital content is identified using locality-sensitive hashing.

7. The method as described in claim 1, further comprising identifying a strategy for achieving an objective of the digital content by comparing the vector representation of the user input to vector representations of candidate strategies for achieving the objective of the digital content.

8. The method as described in claim 1, wherein the structured object format is JavaScript Object Notation that defines the relative order of the plurality of digital content components.

9. The method as described in claim 8, wherein the input text includes a request for the data to be formatted using the JavaScript Object Notation.

10. A system comprising:

a memory component; and a processing device coupled to the memory component, the processing device to perform operations including generating digital content including a plurality of digital content components, automatically, based on a user input specifying an objective for digital content, the generating including:

determining a layout for the digital content based on the user input, the layout defines types of digital content components to be included in the digital content and a relative order of the types of digital content components, the determining including comparing a vector representation of the user input in an embedding space with vector representations of candidate layouts for the digital content, the embeddings generated using a natural language processing model;

generating input text for processing by a language model, the input text including indications of the types of digital content components in the relative order based on the layout;

receiving data in a structured object format generated by the language model based on processing the input text, the data including descriptions of the types of digital content components in the relative order and including alternative text generated by the language model describing an additional one or more objects to be depicted in a digital image as a respective said component; and causing generation of the digital content by processing the data in the structured object format by a generative model, the digital content including the one or more objects as depicted in the digital image generated based on the alternative text as composited as part of the types of digital content components in the relative order.

11. The system as described in claim 10, wherein the layout for the digital content is determined by comparing a vector representation of the user input with vector representations of candidate layouts for the digital content.

12. The system as described in claim 11, wherein the layout for the digital content is determined using locality-sensitive hashing.

13. The system as described in claim 10, wherein the structured object format is JavaScript Object Notation that encodes the relative order.

14. The system as described in claim 13, wherein the input text includes a request for the data to be formatted using the JavaScript Object Notation.

15. A non-transitory computer-readable storage medium storing executable instructions, which when executed by a processing device, cause the processing device to perform operations comprising:

receiving a user input specifying a characteristic for digital content; and generating digital content including a plurality of digital content components, automatically, based on the user input, the generating including:

causing generation of input text based on the characteristic for processing by a language model, the input text including a request to structure data in a structured object format;

receiving the data in a structured object format from the language model based on processing the input text, the data describing a digital content component and including alternative text generated by the language model describing an additional one or more objects to be depicted in a digital image; and causing generation of the digital content as having the characteristic including the plurality of digital content components by processing the data using the generative model, the digital content including the one or more objects as depicted in the digital Image generated based on the alternative text by the generative model as composited as part of the plurality of digital content components.

16. The non-transitory computer-readable storage medium as described in claim 15, wherein the characteristic is an objective of the digital content and the digital content component includes natural language text having a sentiment based on the objective.

17. The non-transitory computer-readable storage medium as described in claim 15, wherein the characteristic is a layout and the digital content component is ordered in the digital content relative to an additional digital content component based on the layout.

18. The non-transitory computer-readable storage medium as described in claim 15, wherein the data includes the alternative text for the digital image that describes the object and the digital content component is the digital image that depicts the object.

19. The non-transitory computer-readable storage medium as described in claim 15, wherein the structured object format is JavaScript Object Notation.

20. The non-transitory computer-readable storage medium as described in claim 15, the operations further comprising identifying a strategy for achieving an objective of the digital content by comparing a vector representation of the user input to vector representations of candidate strategies for achieving the objective.

* * * * *